(12) United States Patent
Ikeda et al.

(10) Patent No.: US 7,733,047 B2
(45) Date of Patent: Jun. 8, 2010

(54) MOTOR CONTROLLER AND MOTOR CONTROL METHOD (75) Inventors: Hidetoshi Ikeda, Tokyo (JP); Satoshi Mizogami, Tokyo (JP); Hiroki Ishii, Tokyo (JP); Tomoaki Sekiguchi, Tokyo (JP)

(73) Assignees: Mitsubishi Electric Corporation, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 154 days.

(21) Appl. No.: 12/162,487

(22) PCT Filed: Feb. 8, 2006

(86) PCT No.: PCT/JP2006/302183

§ 371 (c)(1),
(2), (4) Date: Jul. 29, 2008

(87) PCT Pub. No.: WO2007/091319

PCT Pub. Date: Aug. 16, 2007

(65) Prior Publication Data

US 2009/0175601 A1   Jul. 9, 2009

(51) Int. Cl.
*H02P 7/00* (2006.01)

(52) U.S. Cl. .................. 318/432; 318/609; 318/610; 388/800

(58) Field of Classification Search .......... 318/430, 318/432, 609, 610, 806; 388/800, 811
See application file for complete search history.

(56) References Cited

U.S. PATENT DOCUMENTS 4,751,447 A * 6/1988 Okachi ................. 318/772
4,815,567 A * 3/1989 Ikejima ................ 187/296
5,256,944 A   10/1993 Tobise et al.
5,547,296 A * 8/1996 Iwazawa ............... 400/322
5,773,938 A * 6/1998 Seong et al. ............. 318/6
6,184,644 B1   2/2001 Eguchi (Continued)

FOREIGN PATENT DOCUMENTS

JP   4-121086 A   4/1992

(Continued)

OTHER PUBLICATIONS

"Technology for strip tension control in continuous annealing line"; *Proceedings of the Japan Industry Applications Society Conference*, Japan, No. 2721408 B, (Nov. 21, 1997).

*Primary Examiner*—Paul Ip
(74) *Attorney, Agent, or Firm*—Leydig, Voit & Mayer, Ltd.

(57) ABSTRACT

A motor controller calculates a motor torque command based on motor speed and causes a motor to generate a torque corresponding to the motor torque command, to drive a machine load coupled to the motor. The motor controller includes a speed compensator that makes, when a speed compensation torque is calculated based on the motor speed, frequency characteristics of the speed compensation torque for the motor speed exhibit a low frequency cutoff characteristic so that steady-state gain in frequency response is less than a maximum gain value. A torque adder generates a motor torque command by adding to the existing motor torque command an externally input feedforward torque signal and the speed compensation torque.

8 Claims, 5 Drawing Sheets

U.S. PATENT DOCUMENTS

| | | |
|---|---|---|
| 6,992,454 B2 | 1/2006 | Tsuruta |
| 6,998,810 B2 * | 2/2006 | Kameyama ............... 318/609 |
| 7,068,002 B2 | 6/2006 | Tsutsui |
| 7,319,909 B2 * | 1/2008 | Ishikawa .................. 700/28 |
| 2003/0006723 A1 * | 1/2003 | Sul et al. ................. 318/127 |
| 2004/0169482 A1 | 9/2004 | Maeda |
| 2005/0052149 A1 * | 3/2005 | Kameyama ............... 318/600 |
| 2007/0118262 A1 * | 5/2007 | Nishizaki et al. ............ 701/41 |
| 2007/0159130 A1 * | 7/2007 | Kaneko et al. ............ 318/806 |
| 2007/0268068 A1 * | 11/2007 | Yutkowitz ................ 329/325 |
| 2009/0234498 A1 * | 9/2009 | Takahashi et al. ........... 700/230 |
| 2009/0251092 A1 * | 10/2009 | Zhang et al. ............... 318/609 |

FOREIGN PATENT DOCUMENTS

| | | |
|---|---|---|
| JP | 4-234656 A | 8/1992 |
| JP | 6-7813 A | 1/1994 |
| JP | 10-326114 A | 12/1998 |
| JP | 11-7303 A | 1/1999 |
| JP | 2004-115159 A | 4/2004 |

* cited by examiner

MOTOR CONTROLLER AND MOTOR CONTROL METHOD

TECHNICAL FIELD

The present invention relates to a technology for controlling a motor used as a driving apparatus for various industrial equipments. The invention particularly relates to a motor controller and a motor control method employed in conveying carrier materials, i.e., materials to be carried, such as steel plates, paper sheets, or films.

BACKGROUND ART

A plurality of consecutively arranged transport rolls are typically employed to transport strip-shaped carrier materials such as steel plates, paper sheets, or films, and each of the transport rolls is driven by a dedicated motor. A motor controller is used to control such motors. A typical conventional motor controller includes a speed controller that receives input of a deviation between a speed command and a motor speed, calculates a speed compensation torque that causes the speed command to match an actual speed based on calculation of a proportional control (P control) or a proportional integral control (PI control) based on the received deviation, and adds the speed compensation torque to a motor torque command.

In the above motor controller, the material to be carried is restrained and transported with the transport rolls. In this process, even if a slight difference constantly occurs between the speed command and the speed of a motor operating in conjunction with the carrier material, the speed controller provides control so that no large torque is constantly generated. To realize this, a droop control has been employed. In the droop control, for example, a speed command is subtracted from an amount of a speed droop obtained by proportionally multiplying the speed compensation torque. Moreover, to accurately follow a speed command during accelerating and decelerating a carrier material, such a control has also been performed in which, based on a speed command, an acceleration and deceleration compensation torque necessary for accelerating and decelerating a motor are calculated, and the acceleration and deceleration compensation torque is added to a motor torque command (for example, see Patent Document 1).

Other control has also been performed in which a feedforward compensation is added to a torque command. This feedforward compensation can be a torque necessary for applying tension to a carrier material, or a torque for compensating for machine loss due to friction or the like (for example, see Non-patent Document 1).

[Patent Document 1] Japanese Patent Application Laid-open No. H4-121086 (FIG. 1)

[Non-Patent Document 1] "Technology for strip tension control in continuous annealing line", Proceedings of the Japan Industry Applications Society Conference 1991, pp. 800-801

DISCLOSURE OF INVENTION

Problem to be Solved by the Invention

However, the actual diameter of a transport roll could deviate from a design value, or a carrier material can expand or contract around the transport rolls. For these reasons, in the conventional motor controller, to maintain a constant tension on the carrier material, it is necessary to create a slight difference between the speed command and the speed of a motor operating in conjunction with the carrier material. As a result, even if the droop control is performed, because the speed controller operates so that the difference between the speed command and the constant motor speed kept small, the speed controller constantly generates a large torque. Such a control therefore creates a problem that a tension or pressure applied to the carrier material largely differs from a torque command received from outside.

The present invention is made in view of the problem, and it is an object of the present invention to achieve a motor controller and a motor control method that enable a motor to generate a torque same as a setting value, even when a motor speed and a speed command constantly differ, and that also enable accurate and stable control of a transport speed corresponding to the speed command, with tension or pressure being applied to a carrier material as set externally.

Means for Solving Problem

A motor controller according to a first invention is a motor controller that calculates a motor torque command based on a motor speed and causes a motor to generate a torque corresponding to the motor torque command, so as to drive a machine load coupled to the motor. The motor controller includes a speed compensator that makes, when a speed compensation torque is calculated based on at least the motor speed, frequency characteristics of the speed compensation torque for the motor speed to have low-frequency cutoff characteristics that a steady-state gain in frequency response is less than a maximum gain value; and a torque adder that generates the motor torque command by adding thereto at least an externally input feedforward torque signal and the speed compensation torque.

In the motor controller according to a second invention, the speed compensator makes the frequency characteristics of the speed compensation torque for the motor speed to have low frequency cutoff characteristics that a steady-state gain in frequency response is a minute value including 0.

In the motor controller according to a third invention, the speed compensator receives a reference speed signal calculated based on an externally input motor operation command and the motor speed, and calculates the speed compensation torque based on a speed deviation that is a difference between the reference speed signal and the motor speed.

The motor controller according to a fourth invention includes an acceleration and deceleration compensation calculator that calculates, based on the motor operation command, an acceleration and deceleration compensation torque for accelerating and decelerating the speed of the motor and the machine load so as to match the reference speed signal. The torque adder generates the motor torque command by adding thereto the acceleration and deceleration compensation torque, the feedforward torque signal, and the speed compensation torque.

A motor controller method according to a fifth invention is a motor controller method including calculating a motor torque command based on a motor speed and causes a motor to generate a torque corresponding to the motor torque command, so as to drive a machine load coupled to the motor. The motor controller method includes making, when a speed compensation torque is calculated based on at least the motor speed, frequency characteristics of the speed compensation torque for the motor speed to have low-frequency cutoff characteristics that a steady-state gain in frequency response is less than a maximum gain value; and generating the motor torque command by adding thereto at least an externally input feedforward torque signal and the speed compensation torque.

In the motor controller method according to a sixth invention, the frequency characteristics of the speed compensation torque for the motor speed is made to have low frequency cutoff characteristics that a steady-state gain in frequency response is a minute value including 0.

In the motor controller method according to a seventh invention, a reference speed signal calculated based on an externally input motor operation command and the motor speed is received, and the speed compensation torque is calculated based on a speed deviation that is a difference between the reference speed signal and the motor speed.

The motor controller method according to an eighth invention includes calculating, based on the motor operation command, an acceleration and deceleration compensation torque for accelerating and decelerating the speed of the motor and the machine load so as to match the reference speed signal, and generating the motor torque command by adding thereto the acceleration and deceleration compensation torque, the feedforward torque signal, and the speed compensation torque.

In this specification, the steady-state gain means a gain at frequency 0 in the frequency response. Moreover, the "minute value" in the above mentioned "minute value including 0" refers to, for example, a value equal to or less than about one-fifth of the maximum gain in the frequency response.

EFFECT OF THE INVENTION

According to the first and the fifth inventions, a motor can operate at a stable speed, enabling to reduce the difference between a torque constantly generated by the motor and an externally set feedforward torque signal. Accordingly, a carrier material being transported with the motor can be transported stably, enabling the difference between a tension and pressure applied to the carrier material and a setting value to be made small.

According to the second and the sixth inventions, the motor can operate at a stable speed, enabling the difference between a torque constantly generated by the motor and an externally set feedforward torque signal to be a minute value including 0. Accordingly, a carrier material being transported with the motor can be transported stably, enabling the difference between a tension or pressure applied to the carrier material and a setting value to be a minute value including 0.

According to the third and the seventh inventions, the motor can operate at a stable speed with such excellent characteristics as following changes in motor operation command, enabling to reduce the difference between a torque constantly generated by the motor and an externally set feedforward torque signal. Accordingly, a carrier material can be transported by following the operation command, enabling to reduce the difference between a tension or pressure applied to the carrier material and a setting value.

According to the fourth and the eighth inventions, the motor can operate at a stable speed to perform accurate acceleration and deceleration during the acceleration and deceleration, enabling to reduce the difference between a torque constantly generated by the motor and an externally input feedforward torque signal. This realizes a reduction in the difference between a tension or pressure applied to the carrier material and a setting value even during the acceleration and deceleration.

BEST MODE(S) FOR CARRYING OUT THE INVENTION

First Embodiment

Figure 1:
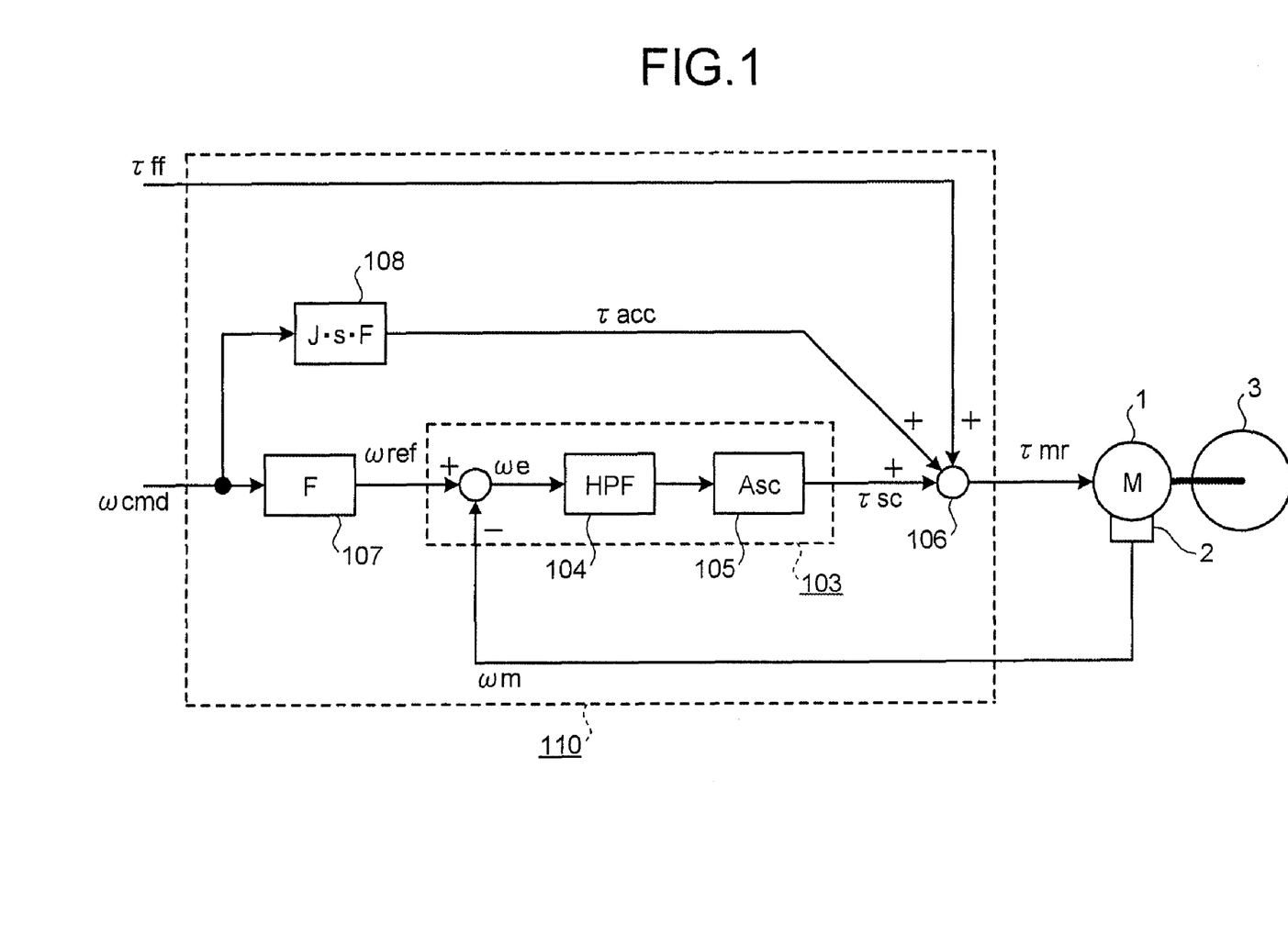
FIG. 1 is a block diagram of a motor controller according to a first embodiment.

FIG. 1 is a block diagram of a motor controller according to a first embodiment of the present invention. As shown in FIG. 1, a motor controller 110 according to the present embodiment receives a feedforward torque signal $\tau ff$ and a speed command $\omega cmd$ from outside, receives a motor speed signal $\omega m$ detected by a speed detector 2, and outputs a motor torque command $\tau mr$ in the manner explained below. A motor 1 generates a torque that matches the motor torque command $\tau mr$ according to the operations of a normal torque control circuit and a normal power conversion circuit (both not shown), so as to drive the motor 1 and a machine load 3. The machine load 3 is, for example, a transport roll coupled to the motor 1.

Specifically, inside the motor controller 110, a reference speed generator 107 receives the speed command $\omega cmd$, performs, for example, a first order calculation to calculate a reference speed signal $\omega ref$ that follows the speed command $\omega cmd$, and outputs the reference speed signal $\omega ref$. A speed compensator 103 receives the reference speed signal $\omega ref$ and the motor speed signal $\omega m$, and outputs a speed compensation torque $\tau sc$. An acceleration and deceleration compensation calculator 108 calculates, according to changes in the speed command $\omega cmd$, a torque necessary for accelerating and decelerating the motor 1 and the machine load 3 coupled to the motor 1, and outputs the calculated torque as an acceleration and deceleration compensation torque $\tau acc$. The acceleration and deceleration compensation torque $\tau acc$ is calculated by a method, for example, calculating a derivative signal of the reference speed signal $\omega ref$, i.e., a reference accelerating and decelerating signal, and multiplying the derivative signal by an inertia moment of the motor 1 and the machine load 3.

A torque adder 106 outputs the motor torque command $\tau mr$ that is a result obtained by adding the feedforward torque signal $\tau ff$, the acceleration and deceleration compensation torque $\tau acc$, and the speed compensation torque $\tau sc$. Eventually, the motor controller 110 outputs the motor torque command $\tau mr$.

Inside the speed compensator 103, a high-pass filter 104 receives the speed deviation ωe, which is a deviation between the reference speed signal ωref and the motor speed signal ωm, and outputs a result of a high-pass filter calculation with the steady-state gain of 0 or a minute value. A speed amplification compensator 105 receives the output of the high-pass filter 104, and outputs the speed compensation torque τsc by amplification calculation such as a proportional calculation, or a pseudo proportional integral calculation using a pseudo integral with a finite steady-state gain.

Figure 2:
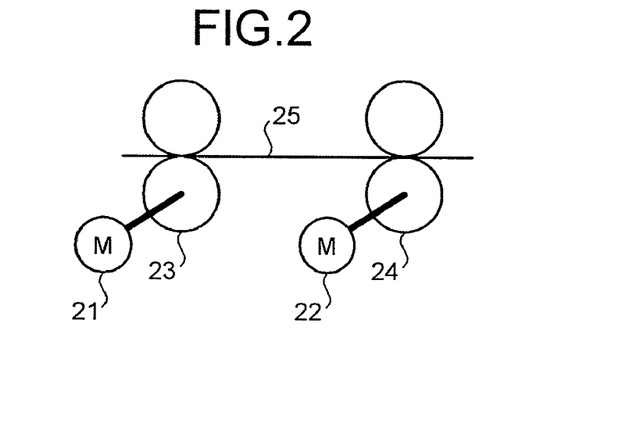
FIG. 2 is a schematic of a transport system to which the motor controller is applied.

Operations according to the present embodiment and advantages achieved thereby are described below. FIG. 2 is a schematic of a transport system that includes the motor controller 110 according to the present embodiment. In the transport system shown in FIG. 2, a first transport roll 23 and a second transport roll 24, provided at upstream and downstream in a transport direction of a carrier material 25, are respectively driven by a first motor 21 and a second motor 22, so as to transport the strip-shaped carrier material 25 such as a steel plate, a paper sheet, or a film. Although FIG. 2 depicts only the first and the second transport rolls 23 and 24, the system may include many transport rolls along the transport direction of the carrier material 25.

In such a transport system, when transporting the material 25 it is preferable that the carrier material 25 be accelerated or decelerated at a desirable transport speed, with a desirable tension being applied to the carrier material 25. The motor controller according to the first embodiment is used to drive, for example, the first motor 21 at the upstream shown in FIG. 2. The second motor 22 at the downstream could be driven with a motor controller that performs normal speed control and positional control.

Operations performed by the motor controller 110 having the above structure according to the present embodiment and advantages achieved thereby are described below. The feedforward torque signal τff represents an externally calculated value as a torque necessary for applying tension to the carrier material 25. More specifically, the feedforward torque signal τff can be obtained by adding a value calculated for mechanical loss due to friction in the motor 1 and the machine load 3 to the torque for applying tension to the carrier material 25.

As described earlier, the motor controller 110 generates the reference speed signal ωref from the speed command ωcmd, calculates the acceleration and deceleration compensation torque τacc necessary for accelerating and decelerating the motor 1 and the machine load 3 so as to match the reference speed signal ωref, and adds the feedforward torque signal τff and the acceleration and deceleration compensation torque τacc to the motor torque command τmr by feedforward control. Assume that the speed compensation torque τsc (described later) is 0, i.e., the speed compensator 103 is omitted and the motor controller 110 operates only by torque control. In this case, acceleration and deceleration of the motor 1 and the machine load 3 are possible with a desirable tension being applied to the carrier material, as long as the feedforward torque signal τff and the acceleration and deceleration compensation torque τacc are accurately calculated and there is no disturbance such as friction variation. This realizes desirable control of the tension and the speed.

When the motor 1 is actually driven only based on the feedforward torque signal τff and the acceleration and deceleration compensation torque τacc, however, the motor speed varies due to various disturbances. Such disturbances include torque pulsation generated by the motor 1, speed pulsation due to mechanical eccentricity of the transport rolls and the machine load 3, friction variation and other variations due to mechanical loss, and compensation errors taking account of transient dynamic characteristics of the motor 1 and the machine load 3 into calculation of the acceleration and deceleration compensation torque τacc. This leads to a problem in that the carrier material is not stably transported.

Characteristics and advantages of the speed compensator 103 according to the present embodiment are described below. The speed compensator 103 can suppress generation of variations in motor speed due to the disturbances. To describe advantages of the present embodiment, the conventional technologies and their problems are explained below by using FIG. 2. In the transport system shown in FIG. 2, the two transport rolls 23 and 24 generally have a roll diameter with a slight error from a design value. In addition, when the tension varies around the transport rolls 23 and 24, the transport speed of the carrier material 25 varies around the transport rolls 23 and 24 due to expansion and contraction of the carrier material 25. Therefore, to maintain a constant tension on the carrier material 25 being restrained and transported with the transport rolls, a slight difference needs to be maintained between the speed command and the speed of the motor operating in conjunction with the carrier material 25. If the motor speed is controlled so as to perfectly match a design value, an excessive tension is applied to the carrier material 25 thereby generating an excessive motor torque equivalent to such tension in the motor.

To take care of this issue, as in the conventional motor controllers described in Patent Document 1 and Non-patent Document 1, a droop control has often been used that subtracts from a speed command a droop amount obtained by multiplying a torque signal that is an output from a speed controller performing proportional integral (PI) control, by a predetermined gain. Even when a slight speed difference constantly occurs, performing such droop control prevents generation of an excessive large motor torque, thus preventing generation of an extremely large (or extremely small) tension to be applied to the carrier material.

Figure 3:
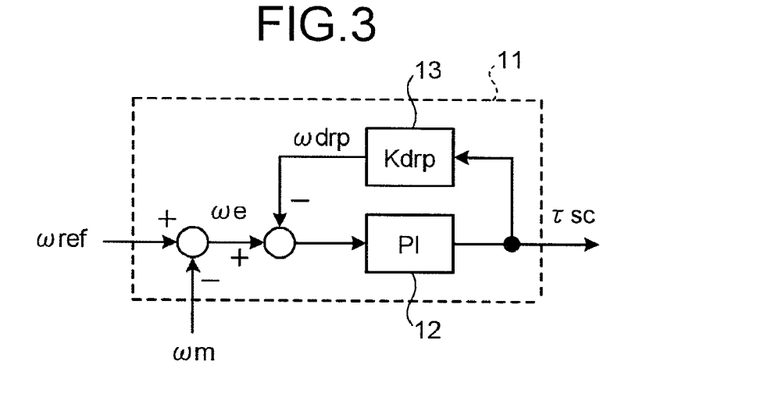
FIG. 3 is a block diagram of a conventional speed compensator for comparison purpose.

FIG. 3 is a block diagram of a conventional speed compensator for comparison with the speed compensator 103 according to the present embodiment. To facilitate understanding of the characteristics and problems of the conventional droop control, conventional droop control is contrasted with the present embodiment as an equivalent (alternative). In other words, a control system can be expressed in which the speed compensator 103 in the motor controller 110 of the present invention shown in FIG. 1 is replaced with a speed compensator 11 shown in FIG. 3.

The speed compensator 11 shown in FIG. 3 receives a reference speed signal ωref and a motor speed signal ωm, and outputs a speed compensation torque τsc. Inside the speed compensator 11, a proportional integral calculator 12 receives a signal obtained by subtracting a droop amount ωdrp (described later) from a speed deviation ωe that is a deviation between the reference speed signal ωref and the motor speed signal ωm. The proportional integral calculator 12 performs a proportional integral calculation PI(s) on the input, and outputs the result as the speed compensation torque τsc. A drooping compensator 13 calculates a droop amount ωdrp by multiplying the speed compensation torque τsc by a predetermined multiplier Kdrp. In this way, the speed compensation compensator 11 outputs the speed compensation torque τsc.

In the speed compensator 11 of FIG. 3, the proportional integral calculator 12 receives a signal obtained by subtracting the droop amount ωdrp from the deviation between the reference speed signal ωref and the motor speed ωm. From another aspect, this structure is understood as an equivalent that the proportional integral calculator 12 receives a deviation between a signal obtained by subtracting the droop amount ωdrp from the reference speed signal ωref, and the motor speed signal ωm. Specifically, by implementing such droop control, the reference speed signal ωref is modified to be small when the speed compensation torque τsc becomes large. This provides an advantage such as preventing the speed compensation torque τsc from becoming extremely large.

A transfer function PI(s) of the proportional integral calculator 12 in the conventional droop control is calculated as expressed by Equation (1):

$$PI(s)=(Kp \cdot s+Ki)/s \quad (1)$$

where s denotes a Laplace operator.

Further, a transfer function from the speed deviation ωe to the speed compensation torque τsc is expressed by Equation (2):

$$\tau sc/\omega e=(Kp \cdot s+Ki)/[(1+Kdrp \cdot Kp)s+Kdrp \cdot Ki] \quad (2)$$

Equation (2) is the same as a transfer function from the motor speed signal ωm to the speed compensation torque τsc, (except for) plus and minus symbols. Hereinafter, a frequency response gain from the speed deviation ωe or the motor speed signal ωm to the speed compensation torque τsc is simply referred to as a frequency response gain in the speed compensator.

When droop control is not used, the frequency response gain in the speed compensator expressed by Equation (2) is the same as that by Equation (1), and the steady-state gain with s=0 becomes infinity. When a slight speed deviation ωe is constantly provided, calculation is performed so as to generate infinite speed compensation torque τsc.

Figure 4:
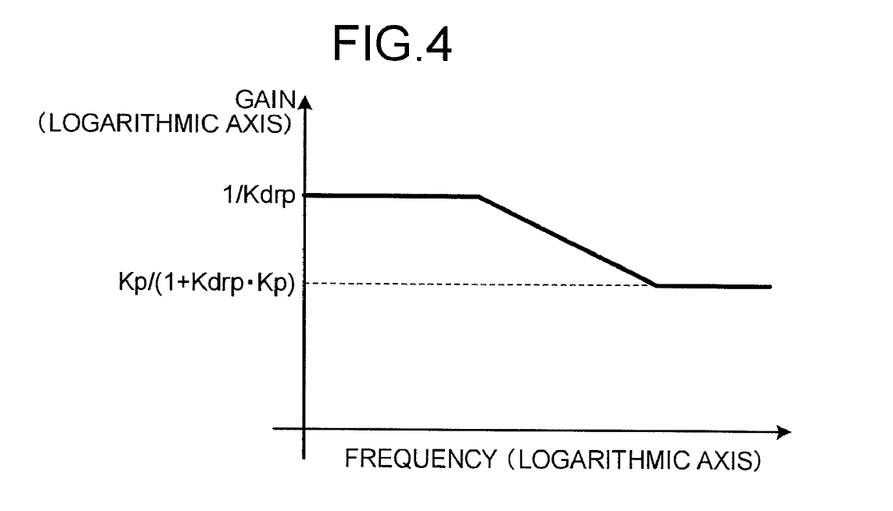
FIG. 4 is a graph of a frequency response gain of the conventional speed compensator for comparison purpose.

On the contrary, when droop control is used, a frequency response gain in the speed compensator is as shown by broken line approximation in FIG. 4. The steady-state gain is found as 1/Kdrp by setting s=0 in Equation (2), and the speed compensation torque τsc becomes finite even when the speed deviation ωe constantly occurs. Compared with the case when droop control is not implemented, the motor torque command τmr is prevented from becoming too large.

When the droop control is used, however, the steady-state gain 1/Kdrp is larger than a high frequency gain Kp/(1+Kdrp·Kp), exhibiting characteristics that the steady-state gain becomes maximum in the frequency response gain. As a result, when a slight difference is provided between the motor speed and the speed command to maintain a constant tension on the carrier material, the transfer speed of the carrier material being restrained and transported with a plurality of transport rolls becomes a large value. Further, when a slight difference is provided to the speed command externally given to the motor 1, the speed compensation torque τsc becomes a large value. This causes a problem in that the tension applied to the carrier material 25 largely differs from the tension applied with the feedforward torque τff.

Figure 5:
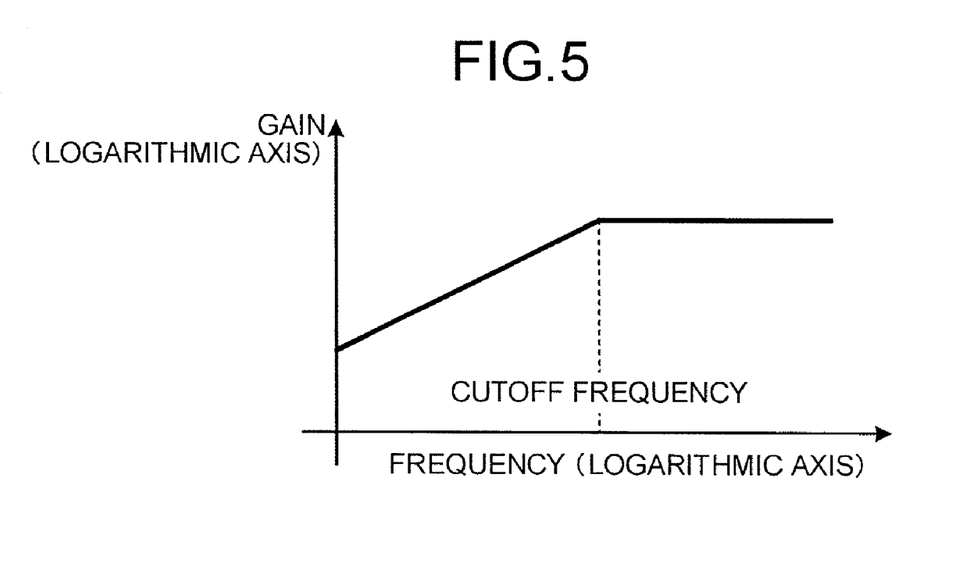
FIG. 5 is a graph of a frequency response gain of a highpass filter according to the first embodiment.
Figure 6:
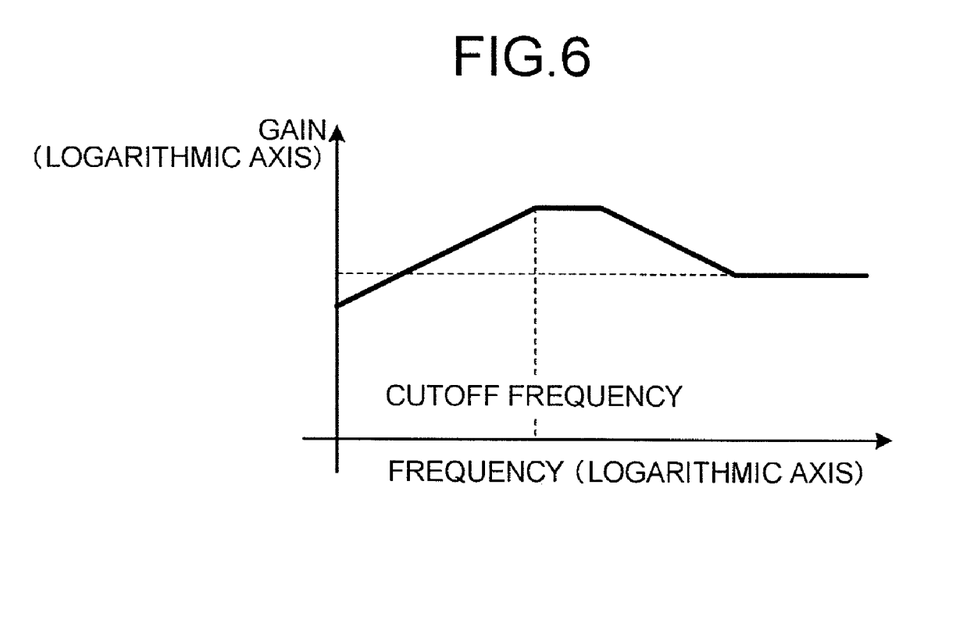
FIG. 6 is a graph of a frequency response gain of a speed compensator according to the first embodiment.

FIG. 5 is a drawing of a frequency response gain, showing characteristics of the high-pass filter 104 according to the present embodiment. FIG. 6 is a drawing of a frequency response gain, showing characteristics of the speed compensator 103 of the present embodiment. In contrast to the conventional speed compensator 11, the speed compensator 103 according to the present embodiment includes the high-pass filter 104 for which a steady-state gain is set as 0 or a minute value; and the speed amplification compensator 105 that performs a proportional calculation, or a pseudo proportional integral calculation by setting a steady-state gain as a finite value. As shown in FIG. 5, the high-pass filter 104 has such low-frequency cutoff characteristics that an attenuation amount is increased as the frequency becomes lower in the lower frequency region relative to the cutoff frequency as a boundary. Specifically, the high-pass filter 104 has such low-frequency cutoff characteristics indicated by a gradual slope down to the left in a graph using a vertical and a horizontal axes as logarithms. Further, the low-frequency cutoff characteristics are such that combined characteristics of the high-pass filter 104 and the speed amplification compensator 105, i.e., characteristics of the speed compensator 103, are as shown in FIG. 6, and that a steady-state gain is a minute value including 0 (which refers to, for example, a value equal to or less than half one-fifth of a maximum frequency response gain).

Accordingly, even when a slight difference is provided between the motor speed and the speed command to maintain a constant tension on the carrier material, a steady-state value of the speed compensation torque τsc output based on the difference becomes a minute value including 0. Thus, the influence of the constant speed difference can be ignored, and a torque corresponding to the value externally given by the feedforward torque signal τff is generated in the motor. Further, a tension corresponding to the torque can be applied to the carrier material.

By setting that the cutoff frequency of the high-pass filter 104 is a far smaller value than that in the speed control band when the high-pass filter 104 is not provided (the smaller value falls in, for example, a lower half area relative to the center of the speed control band), and that the cutoff frequency characteristics form a slope down to the left as in the graph of FIG. 5, the high-pass filter 104 can gradually remove only the constant difference between the speed command ωcmd or the reference speed signal ωref, and the motor speed signal ωm. Further, as in normal speed control systems, variations in the motor speed signal ωm due to the disturbance can be suppressed, realizing operations at a stable motor speed signal ωm.

The speed amplification compensator 105 may have a finite steady-state gain, and may perform a proportional calculation as described, or, for example, a calculation to find Asc(s) as expressed by Equation (3):

$$Asc(s)=(Kp \cdot s+Ki)/(s+K0) \quad (3)$$

The speed amplification compensator 105 may be configured to perform a proportional integral calculation in which droop control is implemented, as in Equation (2) and FIG. 3.

Further, the speed amplification compensator 105 may perform a calculation including a low-pass filtering that removes high frequency noise components and oscillating components.

The steady-state gain of the speed amplification compensator 105 is ideally a minute value including 0 as described. When the steady-state gain is smaller than the maximum value in the frequency response gain in the speed compensator 103, more or less the same advantages can be achieved. Further, when the steady-state gain is equal to or less than one-fifth of the maximum value in the frequency response gain, significant advantages can be achieved compared with a conventional motor controller.

According to the present embodiment, the motor controller 110 having the above structure includes the speed compensator 103 that receives the reference speed signal ωref and the motor speed signal ωm, and calculates the speed compensation torque τsc to exhibit low-frequency cutoff characteristics so that the steady-state gain from the motor speed signal ωm to the speed compensation torque τsc is a minute value including 0. The motor controller 110 further includes the torque adder 106 that generates the motor torque command τmr by adding thereto at least the externally input feedforward torque signal τff and the speed compensation torque τsc. This enables the motor 1 to operate at a stable speed, also enabling the torque constantly generated by the motor 1 to match the externally set feedforward torque signal. Accordingly, the motor 1 can operate at a stable speed, enabling the tension or pressure applied to the carrier material transported by the motor 1 and the machine load 3 to match an externally set value.

The motor controller 110 further includes the acceleration and deceleration compensation calculator 108, and the torque adder 106 that calculates the acceleration and deceleration compensation torque τacc necessary for accelerating and decelerating the speed of the motor 1 and the machine load 3 to match the reference speed signal ωref, and generates the motor torque command τmr by adding thereto the acceleration and deceleration compensation torque τacc, the feedforward torque signal τff, and the speed compensation torque τsc. This structure enables the motor 1 to operate at a stable speed while accelerating and decelerating the motor 1 accurately, also enabling the torque generated by the motor 1 to match the externally set feedforward torque signal in the steady state. Accordingly, even during the acceleration and deceleration, the motor can operate at a stable speed, and the tension or pressure applied to the carrier material transported by the motor 1 and the machine load 3 can match an externally set value.

The motor controller 110 according to the present embodiment receives the speed command ωcmd. Alternatively, for example, when the motor controller 110 operates by positional control such that a neighboring motor corresponds to a positional command, needless to say, the positional command may be input to the motor controller 110, and the reference speed signal ωref and the acceleration and deceleration compensation torque τacc may be calculated based on the positional command inside the motor controller 110. The reference speed generator 107 outputs the reference speed signal ωref that is a signal obtained by performing a first-order lag calculation on the received speed command ωcmd. The reference speed generator 107 may output the speed command ωcmd without processing it.

In the motor controller 110 according to the present embodiment, the speed compensator 103 has the structure as shown in FIG. 1. The speed compensator 103 may have another structure as long as it performs an equivalent calculation. For example, by providing two high-pass filters that perform the calculation as performed by the high-pass filter 104, the reference speed signal ωref and the motor speed signal ωm may be input to each of the high-pass filters, allowing a difference signal between outputs from the high-pass filters to be input to the speed amplification compensator 105. Needless to say, this structure also enables the equivalent calculation.

Second Embodiment

Figure 7:
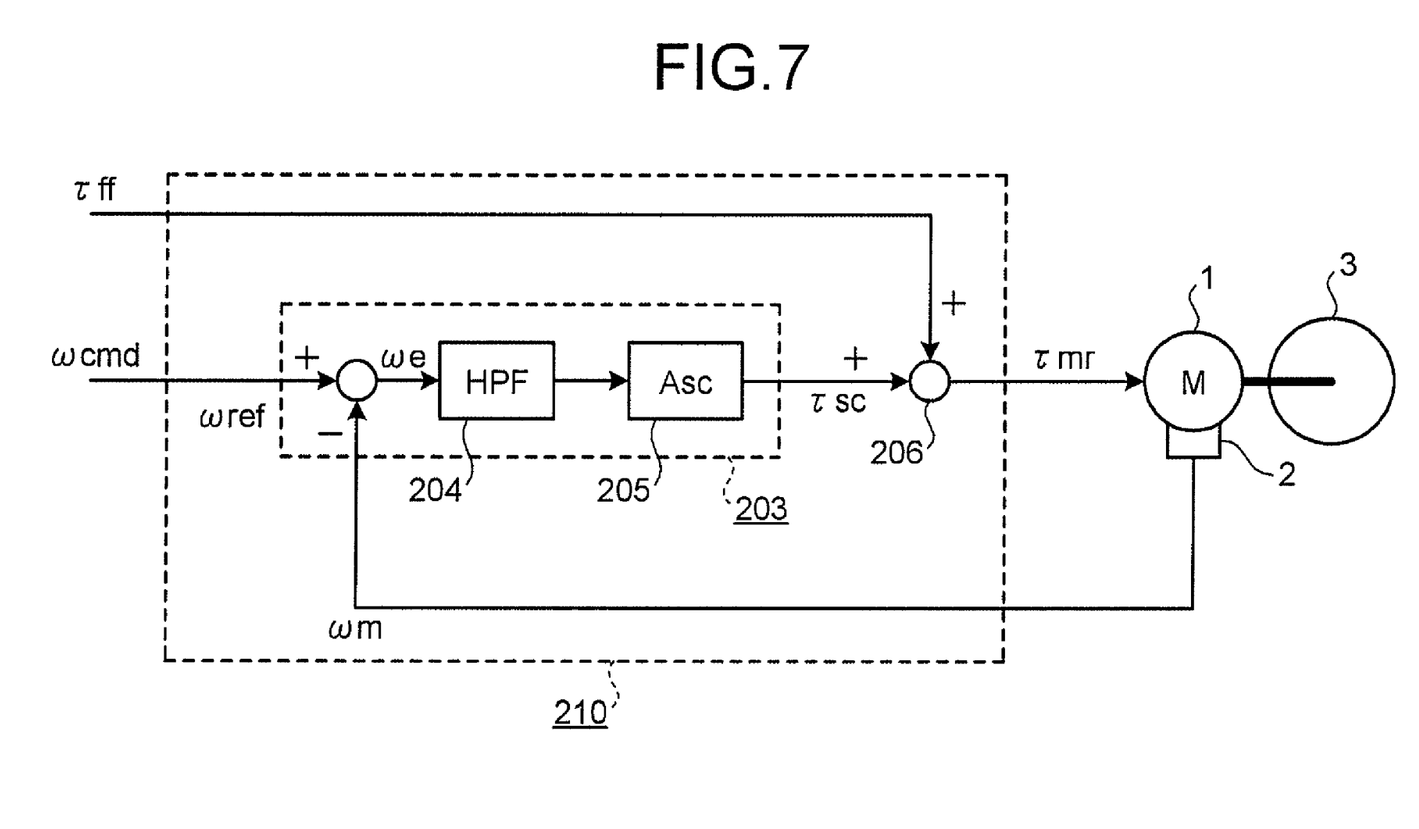
FIG. 7 is a block diagram of a motor controller according to a second embodiment.

FIG. 7 is a block diagram of a motor controller according to a second embodiment of the present invention. In the present embodiment, the reference speed generator 107 according to the first embodiment is omitted. Further, the acceleration and deceleration compensation calculator 108, and the application of the acceleration and deceleration compensation torque τacc to the motor torque command τmr are also omitted. As shown in FIG. 7, a motor controller 210 receives a feedforward torque signal τff and a speed command ωcmd from outside, and receives a motor speed signal ωm detected by the speed detector 2, and outputs a motor torque command τmr by operating as follows. The motor 1 generates a torque that matches the motor torque command τmr according to the operations of a normal torque control circuit and a normal power conversion circuit (both not shown), so as to drive the motor 1 and the machine load 3 such as a transport roll coupled to the motor 1.

Inside the motor controller 210, the speed command ωcmd is input as a reference speed signal ωref, and the speed compensator 203 receives the reference speed signal ωref and the motor speed signal ωm. Inside the speed compensator 203, a high-pass filter 204 receives a speed deviation ωe that is a deviation between the reference speed signal ωref and the motor speed signal ωm, performs a high-pass filter calculation with the steady-state gain of 0 or a minute value, and outputs the result. A speed amplification compensator 205 receives the output from the high-pass filter 204, and performs an amplification calculation such as a proportional calculation, or a pseudo proportional integral calculation using a pseudo integral with a finite steady-state gain, and outputs a speed compensation torque τsc. The speed compensator 203 outputs the speed compensation torque τsc.

A torque adder 206 generates the motor torque command τmr that is a signal to which the externally input feedforward torque signal τff and the speed compensation torque τsc are added, and outputs the signal as an output from the motor controller 210.

According to the present embodiment, the motor controller 210 having the above structure receives the externally input feedforward torque signal τff, which gives an externally calculated value as a torque necessary for applying tension to the carrier material. More specifically, the feedforward torque signal τff may be provided by further adding thereto a value calculated for mechanical loss due to friction on the motor 1 and the machine load 3.

According to the present embodiment, the motor controller 210 having the above structure includes the speed compensator 203 that receives the reference speed signal ωref and the motor speed signal ωm, and calculates the speed compensation torque τsc to have low-frequency cutoff characteristics that the steady-stable gain from the motor speed signal ωm to the speed compensation torque τsc is a minute value including 0. The motor controller 210 further includes the torque adder 206 that generates the motor torque command τmr by adding thereto the torque feedforward signal τff and the speed compensation torque τsc. With this structure, the motor 1 can operate at a stable speed, enabling the torque constantly generated by the motor 1 to match an externally set feedforward torque signal. Further, the motor 1 can operate stably, enabling the tension and pressure applied to the carrier material transported by the motor 1 and the machine load 3 to match an externally set value.

The motor controller 210 of the present embodiment differs from that of the first embodiment in that the acceleration and deceleration compensation torque τacc is not applied to the motor torque command τmr. Accordingly, during the acceleration and deceleration, the motor torque command τmr does not match the feedforward torque signal τff, causing the follow-up characteristics to the speed command ωcmd to be inferior compared with the first embodiment. However, because the speed command ωcmd, i.e., the reference speed signal ωref, is input to the speed compensator 203 and thus the speed compensation torque τsc increases and decreases transiently according to the increase and decrease in the speed command ωcmd, the follow-up characteristics of the motor speed signal ωm to the speed command ωcmd is not significantly deteriorated.

When calculating the feedforward torque signal τff outside the motor controller 210, an acceleration and deceleration compensation torque necessary for accelerating and decelerating the motor 1 and the machine load 3 so as to match the speed command ωcmd may be calculated and added to the feedforward torque signal τff. This brings almost the same advantages as achieved in the first embodiment.

Third Embodiment

Figure 8:
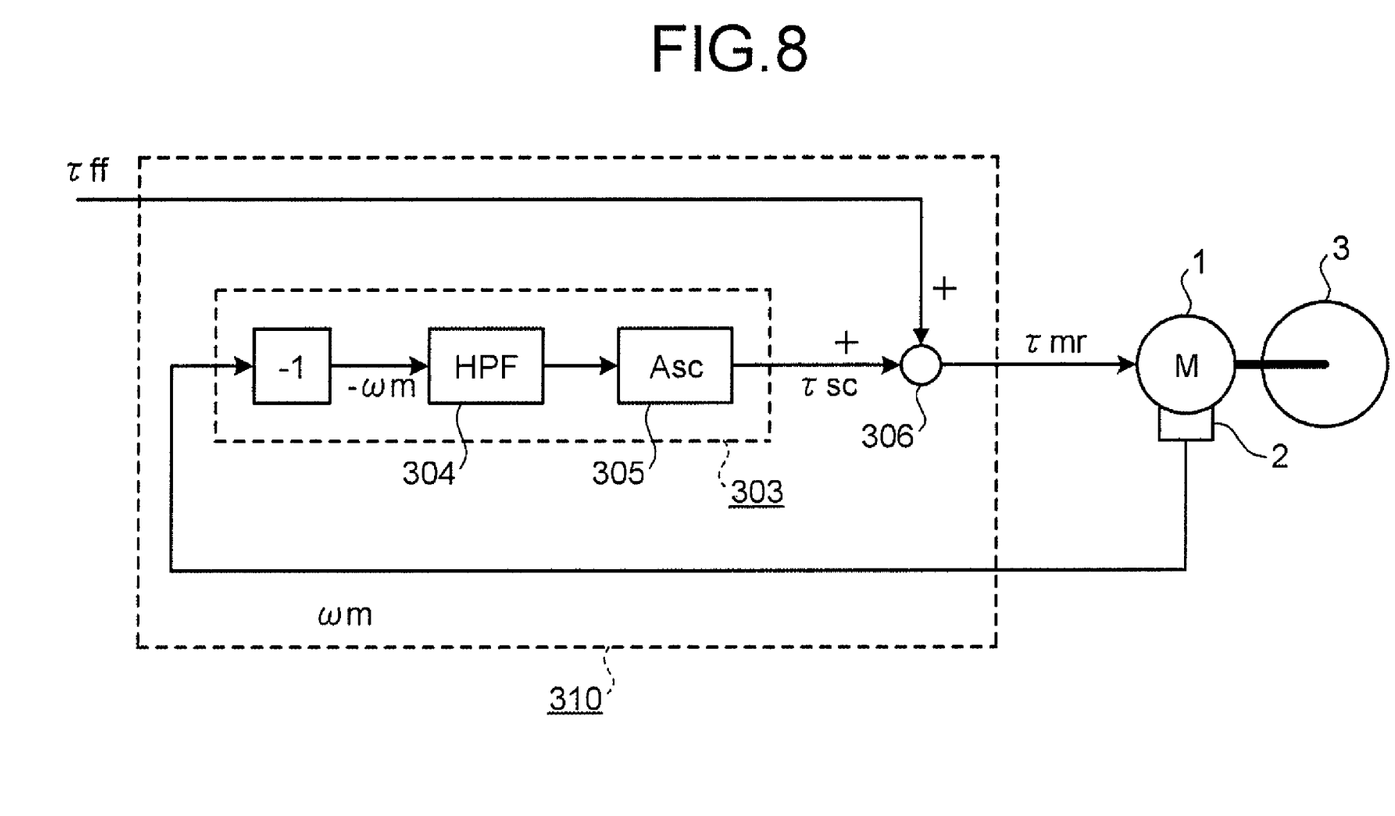
FIG. 8 is a block diagram of a motor controller according to a third embodiment.

FIG. 8 is a block diagram of a motor controller according to a third embodiment of the present invention. In the present embodiment, the input of the speed command ωcmd according to the second embodiment is omitted. In FIG. 8, a motor controller 310 receives an externally input feedforward torque signal τff and a motor speed signal ωm detected by the speed detector 2, and outputs a motor torque command τmr by operating as follows. The motor 1 generates a torque that matches the motor torque command τmr according to the operations of a normal torque control circuit and a normal power conversion circuit (both not shown), so as to drive the motor 1 and the machine load 3 such as a transport roll coupled to the motor 1.

Inside the motor controller 310, a speed compensator 303 receives the motor speed signal ωm. Inside the speed compensator 303, a high-pass filter 304 receives a signal obtained by multiplying the motor speed ωm by −1, performs a high-pass filter calculation with the steady-state gain of 0 or a minute value, and outputs the result. A speed amplification compensator 305 subsequently provided receives the output from the high-pass filter 304, and performs an amplification calculation such as a proportional calculation, or a pseudo proportional integral calculation using a pseudo integral with a finite steady-state gain, so as to output a calculated speed compensation torque τsc as an output from the speed compensator 303.

The torque adder 306 generates the motor torque command τmr that is a signal to which the externally input feedforward torque signal τff and the speed compensation torque τsc are added, and the motor controller 310 outputs the motor torque command τmr.

According to the present embodiment, the motor controller 310 having the above structure receives the externally input feedforward torque signal τff, which gives an externally calculated value as a torque necessary for applying tension to the carrier material. More specifically, the feedforward torque signal τff may be provided by further adding thereto a value calculated for mechanical loss such as friction on the motor 1 and the machine load 3.

According to the present embodiment, the motor controller 310 having the above structure includes the speed compensator 303 that receives the motor speed signal ωm, and calculates the speed compensation torque τsc to have such low-frequency cutoff characteristics that a steady-state gain from the motor speed signal ωm to the speed compensation torque τsc is a minute value including 0. The motor controller 310 further includes the torque adder 306 that generates the motor torque command τmr by adding thereto the externally input feedforward torque signal τff and the speed compensation torque τsc. As in the first and second embodiments, the above structure enables the motor 1 to operate at a stable speed, enabling the torque generated on the motor 1 to match an externally set feedforward torque signal. Further, the motor 1 can operate stably, enabling the tension and pressure applied to the carrier material transported by the motor 1 and the machine load 3 to match an externally set value.

According to the present embodiment, during the acceleration and deceleration of the transport speed of the carrier material, the speed compensator 303 calculates the speed compensation torque τsc based on the motor speed signal ωm, and outputs the speed compensation torque τsc transiently against the acceleration and deceleration. Thus, the speed compensator 303 is not suitable for use when the transport speed is frequently accelerated or decelerated. When the speed compensator 303 is used only for constant speed transportation, however, the same advantages are achieved as in the first and the second embodiments.

INDUSTRIAL APPLICABILITY

As described, the present invention is preferably applied to a motor controller and a motor control method used as a driving device for various industrial equipment. The present invention is particularly applied to a motor controller and a control method for a motor that transports a band-like transport material such as a steel plate, a paper sheet, or a film.

The invention claimed is:

1. A motor controller that calculates a motor torque command based on motor speed of a motor and causes the motor to generate a torque corresponding to the motor torque command to drive a machine load coupled to the motor, the motor controller comprising:
    a speed compensator producing, when speed compensation torque is calculated based on at least the motor speed, a speed compensation torque with a frequency characteristic having a low-frequency cutoff and steady-state gain, as a function of frequency, that is less than a maximum gain value; and
    a torque adder that generates the motor torque command by adding to the motor torque command an externally input feedforward torque signal and the speed compensation torque.

2. The motor controller according to claim 1, wherein the frequency characteristic of the speed compensation torque for the motor speed produced by the speed compensator has a steady-state gain as a function of frequency that is a minute value, including 0.

3. The motor controller according to claim 1, wherein the speed compensator receives (i) a reference speed signal, calculated based on an externally input motor operation command, and (ii) the motor speed, and calculates the speed compensation torque based on speed deviation, which is difference between the reference speed signal and the motor speed.

4. The motor controller according to claim 3, further comprising an acceleration and deceleration compensation calculator that calculates, based on the motor operation command, acceleration and deceleration compensation torque for accelerating and decelerating the motor speed of the motor and the machine load to match the reference speed signal, wherein the torque adder generates the motor torque command by adding to the motor torque command the acceleration and deceleration compensation torque, feedforward torque signal, and the speed compensation torque.

5. A motor control method including calculating a motor torque command based on motor speed of a motor and causing the motor to generate a torque corresponding to the motor torque command to drive a machine load coupled to the motor, the motor control method comprising:
    producing, when speed compensation torque is calculated based on at least the motor speed, a speed compensation torque with a frequency characteristic having a low-frequency cutoff and a steady-state gain as a function of frequency, that is less than a maximum gain value; and generating the motor torque command by adding to the motor torque command at least an externally input feedforward torque signal and the speed compensation torque.

6. The motor control method according to claim 5, wherein the frequency characteristic of the speed compensation torque for the motor speed low frequency has a steady-state gain as a function of frequency that is a minute value, including 0.

7. The motor control method according to claim 5, including receiving a reference speed signal, calculated based on an externally input motor operation command, and the motor speed, and calculating the speed compensation torque based on speed deviation, which is a difference between the reference speed signal and the motor speed.

8. The motor control method according to claim 7, further comprising calculating, based on the motor operation command, acceleration and deceleration compensation torque for accelerating and decelerating the motor speed of the motor and the machine load to match the reference speed signal, and generating the motor torque command by adding to the motor torque command the acceleration and deceleration compensation torque, feedforward torque signal, and the speed compensation torque.

* * * * *